(12) United States Patent
Choi et al.

(10) Patent No.: US 10,526,962 B2
(45) Date of Patent: Jan. 7, 2020

(54) VARIABLE COMPRESSION RATIO APPARATUS

(71) Applicants: Hyundai Motor Company, Seoul (KR); Kia Motors Corporation, Seoul (KR)

(72) Inventors: Myungsik Choi, Seoul (KR); Won Gyu Kim, Seoul (KR); Gyu Han Hwang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 285 days.

(21) Appl. No.: 15/649,245

(22) Filed: Jul. 13, 2017

(65) Prior Publication Data

US 2018/0142615 A1 May 24, 2018

(30) Foreign Application Priority Data

Nov. 23, 2016 (KR) .................. 10-2016-0156755

(51) Int. Cl.
| | |
|---|---|
| *F16K 11/07* | (2006.01) |
| *F16K 31/122* | (2006.01) |
| *F02B 75/04* | (2006.01) |
| *F15B 15/12* | (2006.01) |

(Continued)

(52) U.S. Cl.
CPC ............ *F02B 75/04* (2013.01); *F02B 75/045* (2013.01); *F15B 15/12* (2013.01); *F16C 7/06* (2013.01); *F16K 11/07* (2013.01); *F16K 15/044* (2013.01); *F16K 31/1221* (2013.01)

(58) Field of Classification Search
CPC .............................. F02B 75/045; F16K 11/07
See application file for complete search history.

(56) References Cited

U.S. PATENT DOCUMENTS

| | | | | |
|---|---|---|---|---|
| 4,834,031 | A * | 5/1989 | Katoh ..................... | F02B 75/04 123/48 R |
| 4,864,975 | A * | 9/1989 | Hasegawa ............. | F02B 75/045 123/48 B |

(Continued)

FOREIGN PATENT DOCUMENTS

| | | |
|---|---|---|
| JP | 03-242434 A | 10/1991 |
| KR | 10-2010-0062721 A | 6/2010 |

(Continued)

*Primary Examiner* — Terence Boes
(74) *Attorney, Agent, or Firm* — Morgan, Lewis & Bockius LLP

(57) ABSTRACT

A variable compression ratio apparatus including an eccentric cam interposed at an internal circumference of a front end portion of a connecting rod, in which a first chamber is formed to realize a high compression ratio by a piston by rotating the eccentric cam in one direction and a second chamber is formed to realize a low compression ratio by the piston by rotating the eccentric cam in an opposite direction may include a first spool valve selectively supplying a hydraulic pressure to expand the first chamber or the second chamber for realizing the high compression ratio and the low compression ratio; a second spool valve forming a control hydraulic pressure for the operation of the first spool valve; and an oil control valve controlling the operation of the second spool valve.

19 Claims, 14 Drawing Sheets

(51) Int. Cl.
 *F16C 7/06* (2006.01)
 *F16K 15/04* (2006.01)

(56) References Cited

U.S. PATENT DOCUMENTS

| | | | | |
|---|---|---|---|---|
| 5,146,879 | A * | 9/1992 | Kume | F01M 1/06 |
| | | | | 123/48 B |
| 2017/0159559 | A1* | 6/2017 | Meacham | F16C 3/28 |
| 2017/0167369 | A1* | 6/2017 | Choi | F16C 7/06 |
| 2017/0204784 | A1* | 7/2017 | O'Shea | F16C 7/06 |
| 2017/0241333 | A1* | 8/2017 | Roth | F02B 75/045 |
| 2017/0268419 | A1* | 9/2017 | Kim | F02B 75/04 |
| 2017/0284455 | A1* | 10/2017 | Kim | F02B 75/045 |
| 2017/0342897 | A1* | 11/2017 | Ezaki | F02B 75/045 |
| 2018/0266313 | A1* | 9/2018 | Melde-Tuczai | F02B 75/045 |
| 2019/0055885 | A1* | 2/2019 | Choi | F02D 41/009 |

FOREIGN PATENT DOCUMENTS

| | | | |
|---|---|---|---|
| KR | 10-2011-0062143 A | 6/2011 | |
| WO | WO-2016103554 A1 * | 6/2016 | F02B 75/045 |

* cited by examiner (a)

(b)

(a)

(b)

(a)

(b)

VARIABLE COMPRESSION RATIO APPARATUS

CROSS-REFERENCE TO RELATED APPLICATION

The present application claims priority to Korean Patent Application No. 10-2016-0156755 filed on Nov. 23, 2016, the entire contents of which is incorporated herein for all purposes by this reference.

BACKGROUND OF THE INVENTION

Field of the Invention

The present invention relates to an internal combustion engine, in detail, relates to a variable compression ratio apparatus improving an efficiency of a fuel and an output by varying a compress ratio in a combustion chamber of the internal combustion engine depending on a driving condition of the engine.

Description of Related Art

In general, thermal efficiency of heat engines increases when the compression ratio is high, and in spark ignition engines, thermal efficiency increases when the ignition timing is advanced up to a predetermined level.

However, when the ignition timing is advanced with a high compression ratio in the spark ignition engines, abnormal combustion is generated and the engines may be damaged, so that there is a limit in advance of the ignition timing and accordingly the output is necessarily reduced.

A Variable Compression Ratio (VCR) apparatus is an apparatus that changes the compression ratio of a gas mixture in accordance with the operation state of an engine.

According to a variable compression ratio engine that varies the compression ratio, it improve the fuel efficiency by increasing the compression ratio of a gas mixture under a low load condition and prevents knocking and improves the output by reducing the compression ratio of the gas mixture under a high load condition.

In a case of the current diesel engine, to meet the enhanced exhaust gas regulations, the low temperature combust is realized by reducing the compress ratio through the large volume of the piston combustion chamber, since the cold start performance deteriorates depending on the compress ratio reduction, a glow system is manufactured of a ceramic material to enhance a rigidity thereof and a separate control unit controlling the glow system is added such that a manufacturing cost is increased.

Accordingly, a research for a new structure realizing the variable compress ratio by controlling the position of the piston through the relatively sample structure is in progress, and a structure raising or lowering the piston by rotating an eccentric cam through a hydraulic pressure has developed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a variable compression ratio apparatus reducing the fuel consumption and improving the output by varying the compression ratio of the gas mixture depending on the driving condition of the engine.

A variable compression ratio apparatus including an eccentric cam interposed at an internal circumference of a front end portion of a connecting rod, in which a first chamber is formed to realize a high compression ratio by a piston by rotating the eccentric cam in one direction and a second chamber is formed to realize a low compression ratio by the piston by rotating the eccentric cam in an opposite direction according to an exemplary embodiment of the present invention includes a first spool valve selectively supplying a hydraulic pressure to expand the first chamber or the second chamber for realizing the high compression ratio and the low compression ratio, wherein the first spool valve is provided to connect the piston and the connecting rod or to connect a crankshaft and the connecting rod.

The variable compression ratio apparatus may further include a second spool valve forming a control hydraulic pressure for operation of the first spool valve; and an oil control valve controlling operation of the second spool valve, wherein the second spool valve and the oil control valve are separately provided or integrally formed.

The second spool valve and the oil control valve may be separately provided or integrally formed.

The first spool valve may include a valve housing in which a first and second plunger spaces are formed at one side and the other side inside, a partition path communicating the first and second plunger spaces is formed, a first exit port communicating the first chamber and the first plunger space and a second exit port communicating the second chamber and the second plunger space are formed, and first and second supply ports receiving an oil with the first and second plunger spaces are formed; a plunger device including a first plunger disposed to be slide in the first plunger space and including a first check space formed inside and a first check path connected to an external circumference at the first check space and selectively communicated with the first exit port, a second plunger disposed to be slide in the second plunger space and including a second check space formed inside and a second check path connected to the external circumference in the second check space and selectively communicated with the second exit port, and a connection pipe connecting the first and second plungers to each other through the partition path and including a pipe path connecting the first and second check spaces to each other and an open path leading to the external circumference as the internal circumference; a first check valve disposed in the first check space to move the oil from the pipe path to the first check space in one direction and a second check valve disposed in the second check space to move the oil from the pipe path to the second check space in one direction; and a return member elastically supporting the second plunger.

The second check path and the second exit port may be communicated depending on an oil supply through the first supply port, and the oil supplied through the first supply port and the oil of the first chamber may be supplied to the second chamber through the open path, the pipe path, the second check valve, the second check path, and the second exit port to realize a low compression ratio.

The first check path and the first exit port may be communicated depending on the oil supply through the second supply port, and the oil supplied through the second supply port and the oil of the second chamber may be supplied to the first chamber through the open path, the pipe path, the first check valve, the first check path, and the first exit port to realize a high compression ratio.

An external diameter of the first plunger may be greater than an internal diameter of the partition path, and the external diameter of the second plunger may be greater than the internal diameter of the partition path.

The external diameter of the first plunger and the external diameter of the second plunger may be the same.

The oil supplied through the first supply port may be operated to move the first plunger in one direction, and the oil supplied through the second supply port may be operated to move the second plunger in an opposite direction.

When a force of the return member and the force of an oil pressure supplied through the first supply port is greater than the force of the oil pressure supplied through the second supply port, the second check path and the second exit port may be communicated, the oil supplied through the first supply port and the oil of the first chamber may be supplied to the second chamber through the open path, the pipe path, the second check valve, the second check path, and the second exit port to realize the low compression ratio.

When the force of the oil pressure supplied to the second supply port is greater than the force of the return member and the force of the oil pressure supplied through the first supply port, the first check path and the first exit port are communicated, and the oil supplied through the second supply port and the oil of the second chamber is supplied to the first chamber through the open path, the pipe path, the first check valve, the first check path, and the first exit port to realize the high compression ratio.

The return member may be disposed inside the second plunger space to be an elastic member to elastically support the second plunger.

The oil supplied to the first chamber may rotate the eccentric cam in one direction by a predetermined angle to increase a top dead center of the piston, and the oil supplied to the second chamber may rotate the eccentric cam in the other direction by a predetermined angle to lower a top dead center of the piston.

The oil supplied to the first chamber may rotate the eccentric cam in one direction by a predetermined angle to increase the top dead center of the piston, and the oil supplied to the second chamber may rotate the eccentric cam in the other direction by a predetermined angle to lower the top dead center of the piston.

In a state that the first and second plungers move in one direction, the open path may be connected to the first plunger space, and in a state that the first and second plungers move in an opposite direction, the open path may be connected to the second plunger space.

The piston may include a first to fourth pistons corresponding to each cylinder, the first spool valve may be respectively provided corresponding to the first to fourth pistons, and the first spool valves may be respectively disposed to be crossed in a forward direction and a backward direction with respect to a direction that the return member is disposed.

The piston may include a first to fourth pistons disposed respectively corresponding to each of the cylinders, the first spool valve may be respectively provided corresponding to the first to fourth pistons, and the first spool valves may be respectively disposed to be cross in the forward direction or the backward direction with respect to the direction that the return member is disposed.

A contact portion supporting the crankshaft to be rotatable may be formed at the crankshaft, and a second control path connected to the first supply port of the first spool valve or a first control path connected to the second supply port may be formed at the contact portions.

The second control path and the first control path may be formed at one among the contact portions.

One of the second control path and the first control path may be only formed at one among the contact portions.

The first control path may be only formed at one among the contact portions, and the second control path may be only formed at the other contact portion adjacent to one among the contact portions.

One among the first control path and one among the second control path may be formed to be crossed to each other.

According to an exemplary embodiment of the present invention, the control valve structure controlling the hydraulic pressure inside the valve housing or the crank pin is configured, and the top dead center of the piston effectively moves up or down through the hydraulic pressure supplied to the control valve, thereby easily realizing the high compression ratio and the low compression ratio.

As the control valve rapidly returns the oil of the low pressure part to the high pressure part through the movement of the check valve and the plunger, the high compression ratio and the low compression ratio are rapidly and correctly realized.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
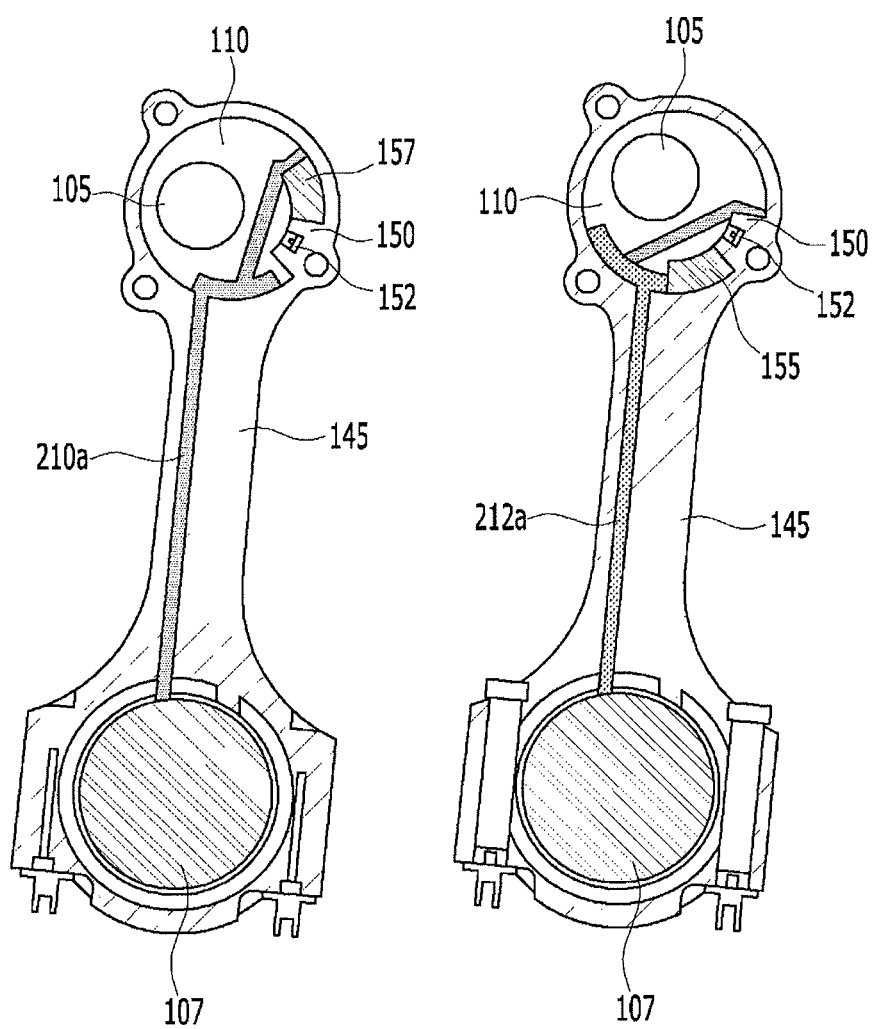
FIG. 1 is a partial cross-sectional view of a variable compression ratio apparatus according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

The sizes and thicknesses of the configurations shown in the drawings are provided selectively for the convenience of description, such that the present invention is not limited to those shown in the drawings and the thicknesses are exaggerated to make some parts and regions clear.

However, parts which are not related with the description are omitted for clearly describing the exemplary embodiment of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a partial cross-sectional view of a variable compression ratio apparatus according to an exemplary embodiment of the present invention.

Referring to FIG. 1, a variable compression ratio apparatus includes a crank pin 107, a connecting rod 145, an eccentric cam 110, a piston pin 105, a first chamber 155, a second chamber 157, a first chamber connection path 212a, a second chamber connection path 210a, a chamber separation wall 150, and a sealing member 152 as main constituent elements.

The piston pin 105 is inserted to an upper portion (small-diameter portion) of the connecting rod 145 to connect a piston 500 (referring to FIG. 5) and the upper portion of the connecting rod 145, and the eccentric cam 110 is interposed between the external circumference of the piston pin 105 and the upper internal circumference of the connecting rod 145.

A chamber groove is formed at one side of the eccentric cam 110 and the chamber separation wall 150 is inserted to the chamber groove to form a first chamber 155 and a second chamber 157.

The chamber separation wall 150 is fixed to the upper internal circumference of the connecting rod 145. Also, the sealing member 152 forms a sealing structure between the chamber separation wall 150 and the eccentric cam 110 to separate the first chamber 155 and the second chamber 157.

The first chamber connection path 212a is connected to the first chamber 155 such that a hydraulic pressure supplied to the first chamber connection path 212a rotates the eccentric cam 110 in a clockwise direction in the drawing to move up the piston pin 105, realizing a high compression ratio.

The second chamber connection path 210a is connected to the second chamber 157 such that the hydraulic pressure supplied to the second chamber connection path 210a rotates the eccentric cam 110 in a counterclockwise direction to move down the piston pin 105, thereby realizing a low compression ratio.

Figure 2:
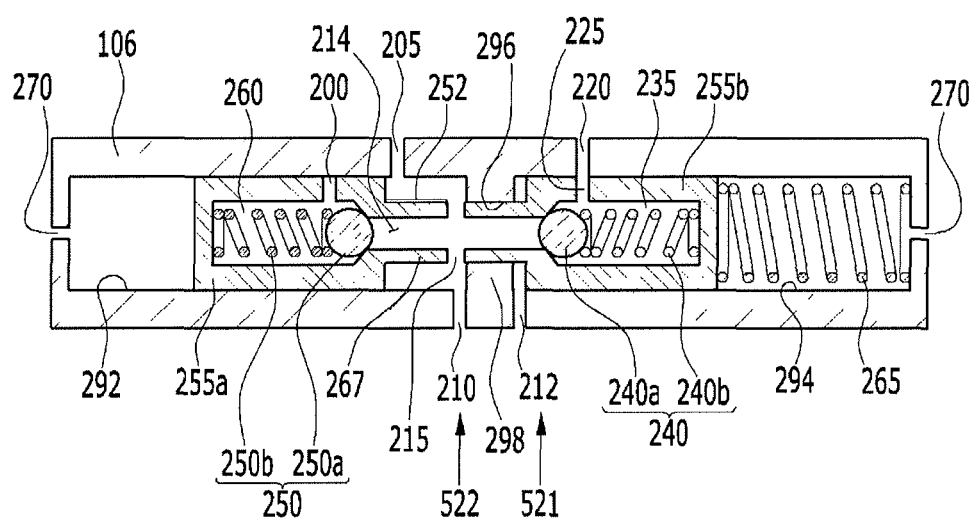
FIG. 2 is a cross-sectional view showing a low compression ratio mode of a first spool valve in a variable compression ratio apparatus according to an exemplary embodiment of the present invention.

FIG. 2 is a cross-sectional view showing a low compression ratio mode of a first spool valve in a variable compression ratio apparatus according to an exemplary embodiment of the present invention.

Referring to FIG. 2, a first spool valve 109 includes a valve housing 106, a first plunger space 292 is formed at one side (a left of FIG. 2) inside the valve housing 106, and a second plunger space 294 is formed at the other side (a right of FIG. 2).

A partition 298 is formed between the first plunger space 292 and the second plunger space 294, and a partition path 296 connecting the first plunger space 292 and the second plunger space 294 is formed at a center of the partition 298.

A vent hole 270 is at the valve housing 106 to communicate the first plunger space 292 with an outside, and a vent hole 270 to communicate the second plunger space 294 with the outside is formed.

In the valve housing 106, a first supply port 210 to supply the oil to the first plunger space 292 is formed downward in the drawing, a second supply port 212 to supply the oil to the second plunger space 294 downward in the drawing, and the first supply port 210 and the second supply port 212 are formed close to the partition 298.

Also, in the valve housing 106, a first exit port 205 communicated from the first plunger space 292 to the first chamber 155 and a second exit port 220 communicated from the second plunger space 294 to the second chamber 157 are formed, and the first exit port 205 and the second exit port 220 are positioned relatively far from the partition 298 compared with the first supply port 210 and the second supply port 212.

A first plunger 255a is disposed at the first plunger space 292, and the sealing structure is formed between the external circumference of the first plunger 255a and the internal circumference of the first plunger space 292. A second plunger 255b is disposed at the second plunger space 294 and the sealing structure is formed between the external circumference of the second plunger 255b and the internal circumference of the second plunger space 294.

A first check space 260 is formed inside the first plunger 255a and a first check path 200 is formed from the first check space 260 to the external circumference side. Here, the first check path 200 is selectively communicated with the first exit port 205 depending on the moving position of the first plunger 255a.

A second check space 235 is formed inside the second plunger 255b, and a second check path 225 is formed from the second check space 235 to the external circumference. Here, the second check path 225 is selectively communicated with the second exit port 220 depending on the moving position of the second plunger 255b.

The connection pipe 267 connects the first plunger 255a and the second plunger 255b to each other, and a pipe path 214 connecting the first check space 260 and the second check space 235 is formed therein.

An open path 215 leading from the internal circumference to the external circumference side is formed in the connection pipe 267, and the open path 215 is communicated with the first plunger space 292 or the second plunger space 294 depending on the moving position of the connection pipe 267.

In an exemplary embodiment of the present invention, a first check valve 250 including a check ball 250a and a spring 250b is disposed at the first check space 260, and the first check valve 250 prevents the oil of the first check space 260 from being moved to the pipe path 214 to move the oil from the pipe path 214 to the first check space 260 in one direction.

A second check valve 240 including a check ball 240a and a spring 240b is disposed at the second check space 235, and the second check valve 240 prevents the oil of the second check space 235 from being moved to the pipe path 214 to move the oil from the pipe path 214 to the second check space 235 in one direction.

As shown in the drawing, the external diameter of the connection pipe 267 includes a small-diameter portion 252 that is smaller than external diameter of the first plunger 255a and the second plunger 255b, and the external diameter of the first plunger 255a and the external diameter of the second plunger 255b are formed to be equal to each other.

The return member 265 as an elastic member of the spring type elastically supports the second plunger 255b at the second plunger space 294 and may move the first plunger 255a, the connection pipe 267, and the second plunger 255b in the left direction in the drawing.

In an exemplary embodiment of the present invention, when a sum (P1+F) of a force P1 of the oil supplied through the first supply port 210 and a force F of the return member 265 is greater than the force P2 of the oil supplied through the second supply port 212, the first plunger 255a, the connection pipe 267, and the second plunger 255b move in one direction (the left direction).

Also, the second supply port 212 is closed, the oil supplied through the first supply port 210 is supplied to the second chamber 157 through the open path 215, the pipe path 214, the second check valve 240, the second check path 225, and the second exit port 220, and the oil of first chamber 155 is returned to the second chamber 157 through the first exit port 205, the open path 215, the pipe path 214, the second check valve 240, the second check path 225, and the second exit port 220.

Accordingly, the position of the piston 100 is lowered with reference to the connecting rod 145 and the top dead center thereof is lowered, thereby realizing a low compression ratio.

In the present exemplary embodiment of the present invention, the structure of the first plunger 255a, the second plunger 255b, and the connection pipe 267 is referred to as a plunger device (not indicated by a reference numeral).

Figure 3:
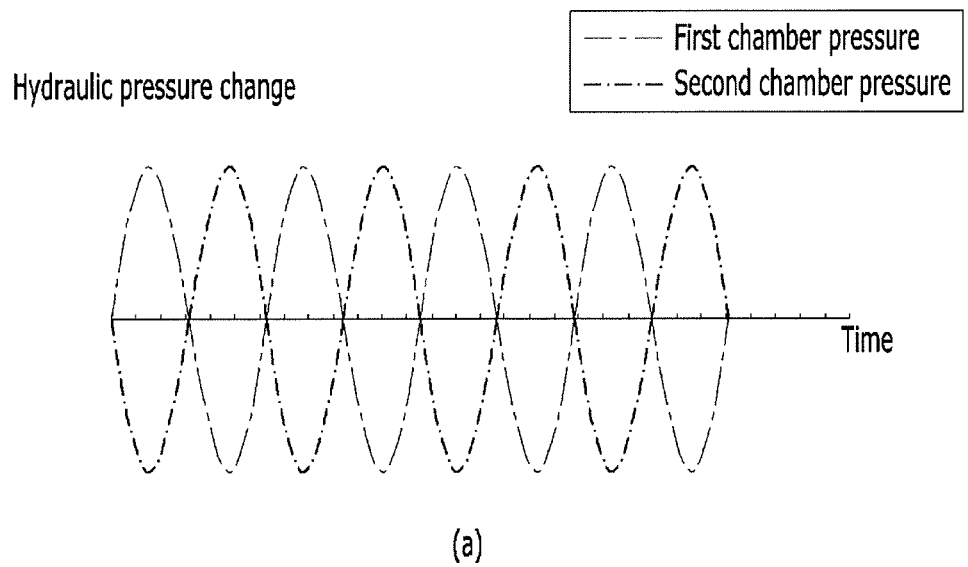
FIG. 3 is a graph showing a characteristic of a hydraulic pressure change and an oil moving to a second chamber in a low compression ratio mode of a variable compression ratio apparatus according to an exemplary embodiment of the present invention.
Figure 3:
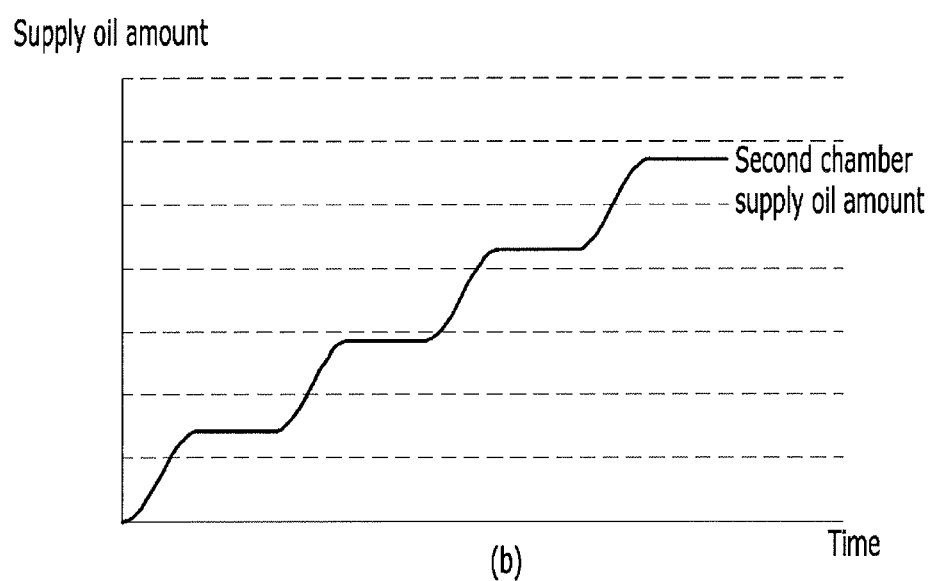

FIG. 3 is a graph showing a characteristic of a hydraulic pressure change and an oil moving to a second chamber in a low compression ratio mode of a variable compression ratio apparatus according to an exemplary embodiment of the present invention.

Referring to FIG. 3 (a), a horizontal axis represents a time, a vertical axis represents a hydraulic pressure, and the pressures of the first chamber 155 and the second chamber 157 are changed with a predetermined cycle in opposite directions to each other depending on the change of the force applied to the piston 100 when driving the engine.

Referring to FIG. 3 (b), the horizontal axis represents the time, the vertical axis represents an amount of the oil supplied to the second chamber 157, the oil is sequentially supplied to the second chamber 157 depending on the change of the force applied to the piston 100 when driving the engine, and the oil of the second chamber 157 is not returned by the second check valve 240.

The pressures of the first chamber 155 and the second chamber 157 are periodically changed and the oil supply of the second chamber 157 is possible, however the oil return of the second chamber 157 is prevented such that the eccentric cam 110 is rotated in the counterclockwise direction and the piston pin 105 moves downward, realizing the low compression ratio.

Figure 4:
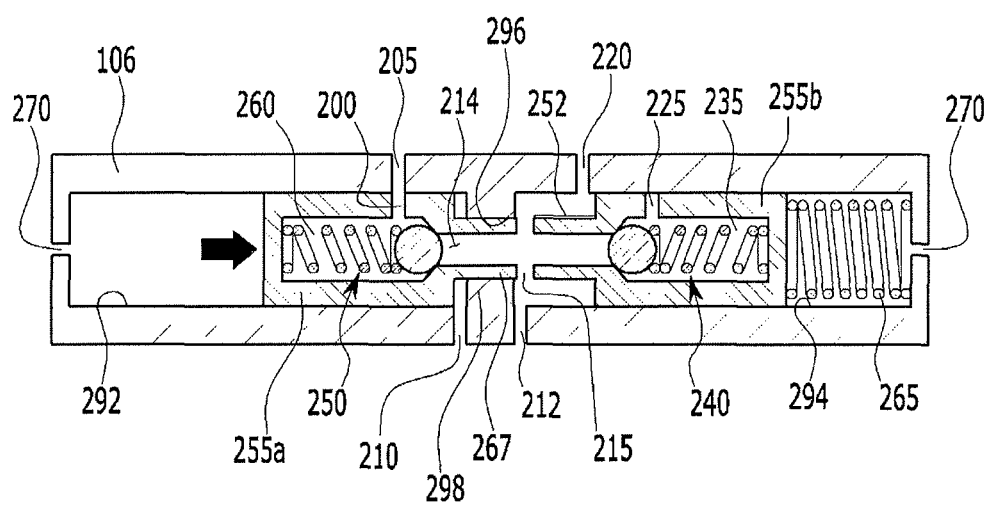
FIG. 4 is a cross-sectional view showing a high compression ratio mode of a first spool valve in a variable compression ratio apparatus according to an exemplary embodiment of the present invention.

FIG. 4 is a cross-sectional view showing a high compression ratio mode of a first spool valve in a variable compression ratio apparatus according to an exemplary embodiment of the present invention, main differences compared with FIG. 2 will be described, and the detailed description for the same or similar parts is omitted.

Referring to FIG. 4, considering the force P1 of the hydraulic pressure supplied through the first supply port 210, the force P2 of the hydraulic pressure supplied through the second supply port 212, and the elastic force F of the return member 265, in the condition of P2<(P1+F), the first plunger 255a, the connection pipe 267, and the second plunger 255b move in the other side direction (the right of the drawing) while compressing the return member 265.

Accordingly, the oil supplied through the first supply port 210 is blocked by the first plunger 255a, and the oil supplied to the second plunger space 294 through the second supply port 212 is sequentially supplied to the first chamber 155 through the open path 215, the pipe path 214, the first check valve 250, the first check space 260, the first check path 200, and the first exit port 205.

Also, by the pressure change, the oil of the second chamber 157 is returned to the first chamber 155 through the second exit port 220, the open path 215, the pipe path 214, the first check valve 250, the first check path 200, and the first exit port 205.

Accordingly, the piston 100 moves upward with reference to the valve housing 106, and the top dead center increases, thereby realizing the high compression ratio.

Referring to FIG. 1 and FIG. 2, the first spool valve 109 may connect the connecting rod 145 and a crankshaft 505 (referring to FIG. 5) like the function of the crank pin 107. Accordingly, the first and second plungers 255a and 255b move in the left by the sum of the hydraulic pressure supplied to the first supply port 210 of the first spool valve 109 and the pressure of the return member 265 and the second chamber 157 is expanded, thereby realizing the low compression ratio.

Also, the first and second plungers 255a and 255b move in the right by the hydraulic pressure supplied to the second supply port 212 of the first spool valve 109 and the first chamber 155 is expanded, there realizing the high compression ratio.

Again referring to FIG. 1 and FIG. 2, the first spool valve 109 may connect the piston 500 (referring to FIG. 5) and the connecting rod 145 like the function of the piston pin 105. Accordingly, the first and second plungers 255a and 255b move in the left by the sum of the hydraulic pressure supplied to the first supply port 210 of the first spool valve 109 and the pressure of the return member 265 and the second chamber 157 is expanded, thereby realizing the low compression ratio.

Also, the first and second plungers 255a and 255b move in the right by the hydraulic pressure supplied to the second supply port 212 of the first spool valve 109 and the first chamber 155 is expanded, thereby realizing the high compression ratio.

Figure 5:
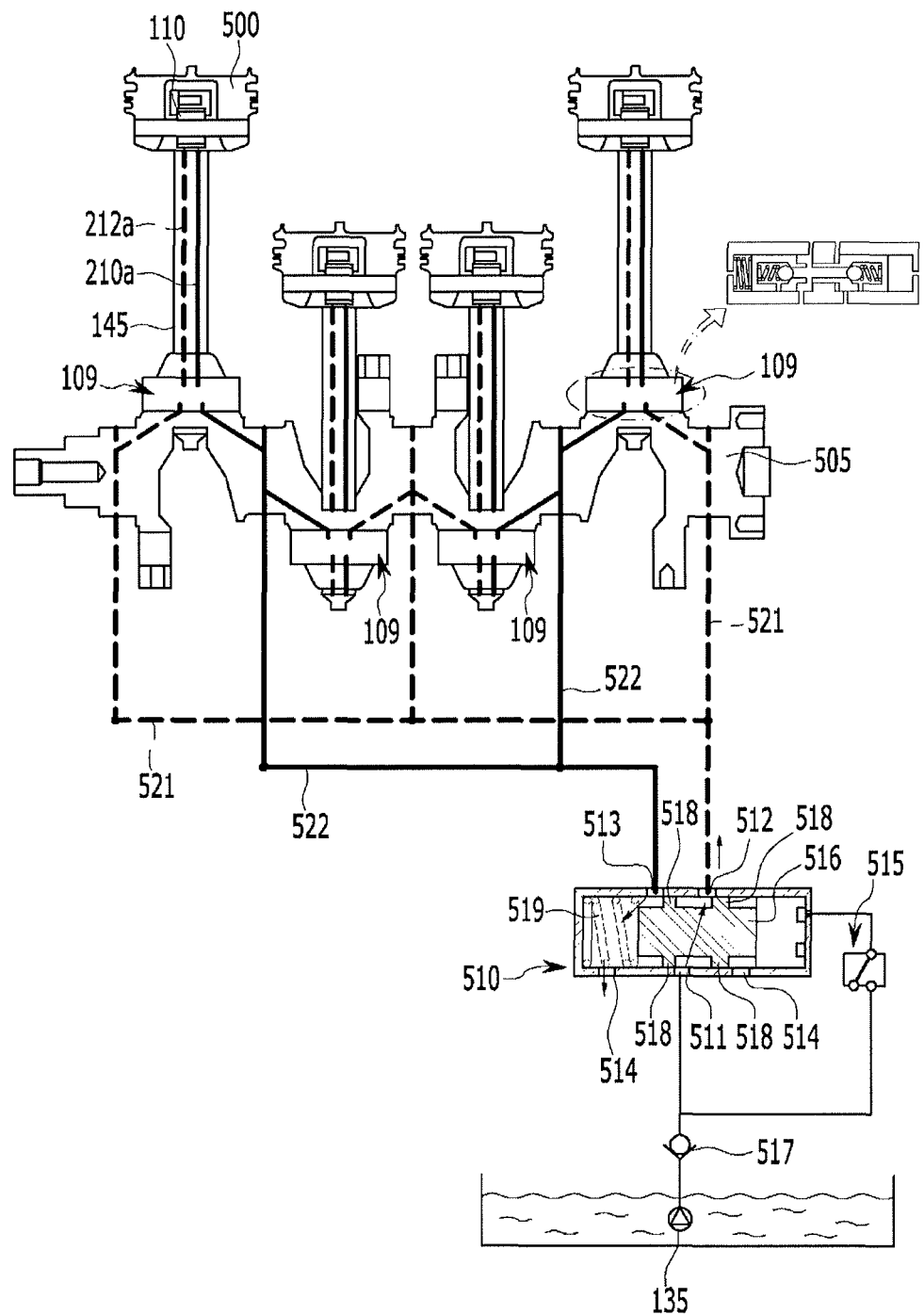
FIG. 5 is a cross-sectional view showing a hydraulic pressure flow in a high compression ratio mode of a variable compression ratio apparatus according to an exemplary embodiment of the present invention.

FIG. 5 is a cross-sectional view showing a hydraulic pressure flow in a high compression ratio mode of a variable compression ratio apparatus according to an exemplary embodiment of the present invention.

Referring to FIG. 5, the variable compression ratio apparatus includes a piston 500, an eccentric cam 110, a connecting rod 145, a piston pin 105, a first chamber connection path 212a, a second chamber connection path 210a, a first spool valve 109, a first control line 521, a second control line 522, a second spool valve 510, an oil control valve 515, a check valve 517, and a hydraulic pump 135 as the constituent elements.

The hydraulic pump 135 pumps the oil and the oil control valve 515 controls the operation of the second spool valve 510 to supply the hydraulic pressure to first control line 521 or to the second control line 522.

The first control line 521 is connected to the second supply port 212 of the first spool valve 109 through the crankshaft 505, and the second control line 522 is connected to the first supply port 210 of the first spool valve 109 through the crankshaft 505.

In the second spool valve 510, an oil input hole 511 communicated with the hydraulic pump 135, a first oil supply hole 512 communicated with the first control line 521, a second oil supply hole 513 communicated with the second control line 522, and an oil exhaust hole 514 exhausting the oil of the second spool valve 510.

In the second spool valve 510, a third plunger 516 including a land 518 selectively communicating the oil input hole 511 and the first oil supply hole 512 or the oil input hole 511 and the second oil supply hole 513 is provided, and an elastic member 519 elastically supporting the third plunger 516 is provided in the second spool valve 510.

In an exemplary embodiment of the present invention, when the control hydraulic pressure is not supplied to the second spool valve 510 by the oil control valve 515, the third plunger 516 of the second spool valve 510 moves in the right by the elastic member 519 of the second spool valve 510.

Accordingly, as shown in the drawing, the oil input hole 511 and the first oil supply hole 512 are communicate with each other and the hydraulic pressure is supplied to the first control line 521.

Accordingly, the hydraulic pressure is supplied to the second supply port 212 of the first spool valve 109 connected to the first control line 521, as shown in FIG. 1 (b) and FIG. 4, the first chamber 155 is expanded, thereby realizing the high compression ratio.

Figure 6:
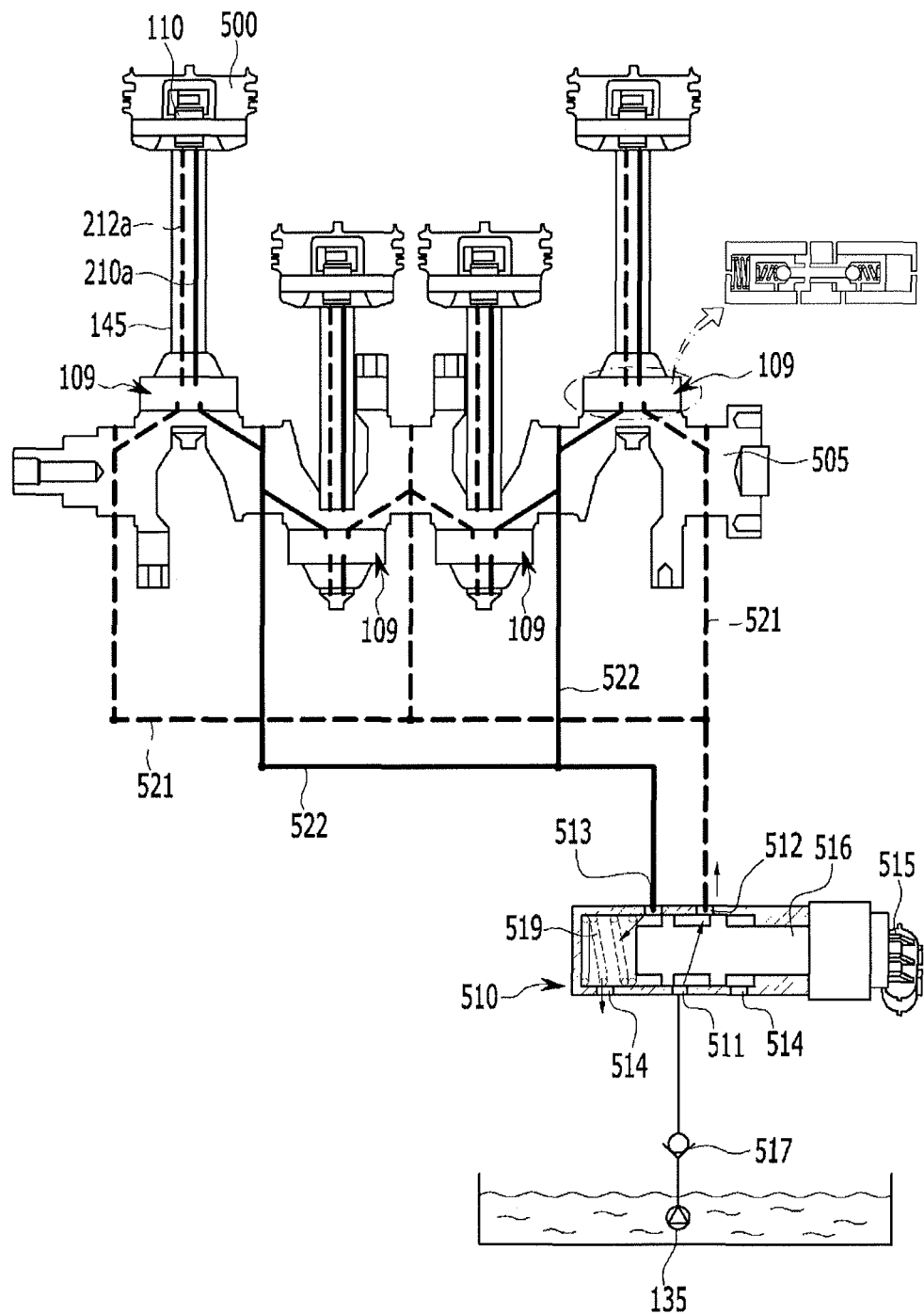
FIG. 6 is a cross-sectional view showing a hydraulic pressure flow in a high compression ratio mode of a variable compression ratio apparatus according to another exemplary embodiment of the present invention.

FIG. 6 is a cross-sectional view showing a hydraulic pressure flow in a high compression ratio mode of a variable compression ratio apparatus according to another exemplary embodiment of the present invention, and differences will be described compared with FIG. 5.

Referring to FIG. 6, the oil control valve 515 is integrally formed in the second spool valve 510, the plunger of the second spool valve 510 moves in the right by the force pushing force of the elastic member of the second spool valve 510 by the control of the oil control valve 515, the oil input hole 511 and the first oil supply hole 512 are communicate with each other, and the hydraulic pressure is supplied to the first control line 521.

Accordingly, the hydraulic pressure is supplied to the second supply port 212 of the first spool valve 109 connected to the first control line 521, as shown in FIG. 2 and FIG. 4, the first chamber 155 is expanded, thereby realizing the high compression ratio.

Figure 7:
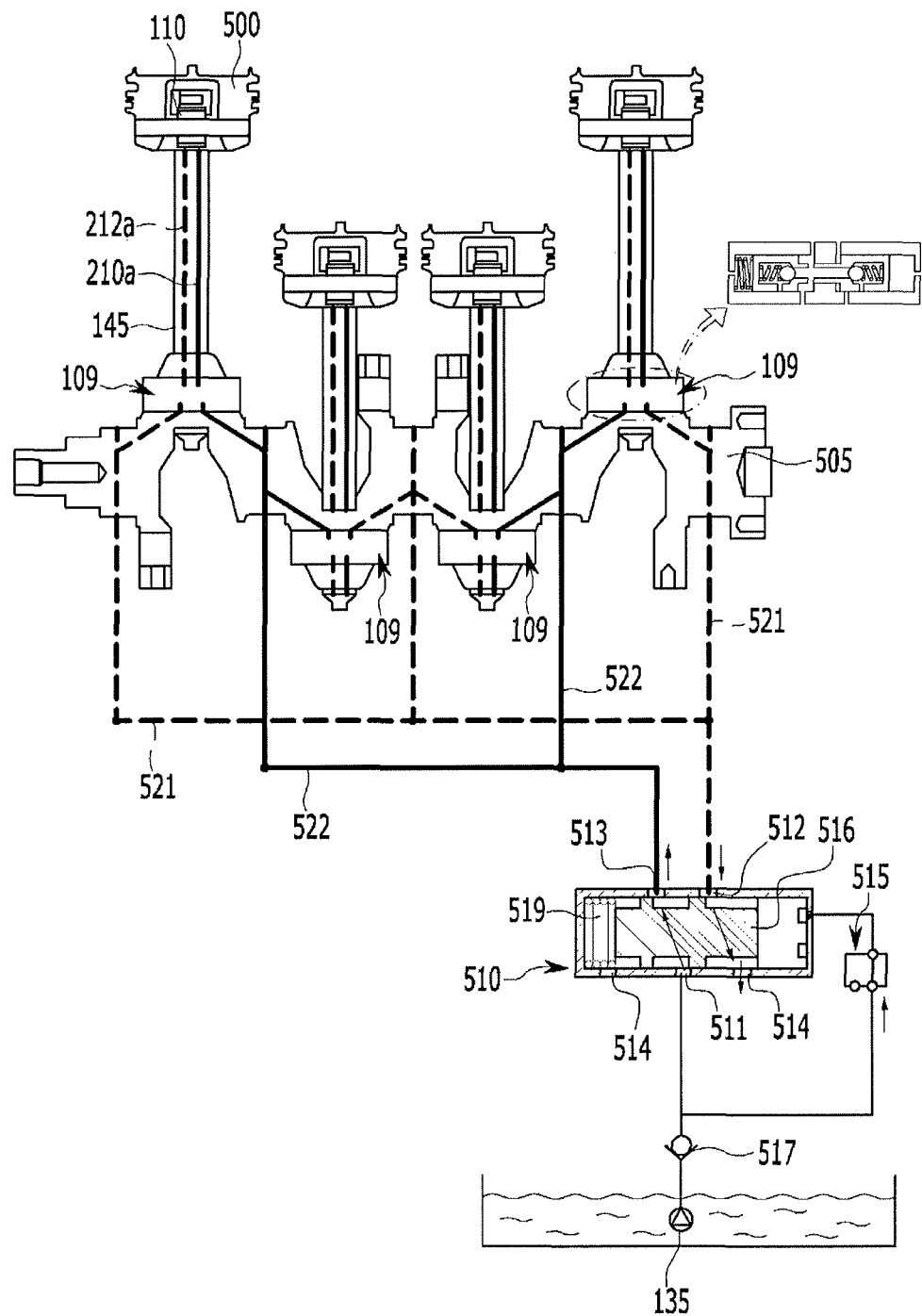
FIG. 7 is a cross-sectional view showing a hydraulic pressure flow in a low compression ratio mode of a variable compression ratio apparatus according to an exemplary embodiment of the present invention.

FIG. 7 is a cross-sectional view showing a hydraulic pressure flow in a low compression ratio mode of a variable compression ratio apparatus according to an exemplary embodiment of the present invention, and differences from FIG. 5 and FIG. 6 will be described.

Referring to FIG. 7, the variable compression ratio apparatus includes a piston 500, an eccentric cam 110, a connecting rod 145, a piston pin 105, a first chamber connection path 212a, a second chamber connection path 210a, a first spool valve 109, a first control line 521, a second control line 522, a second spool valve 510, an oil control valve 515, a check valve 517, and a hydraulic pump 135.

The hydraulic pump 135 pumps the oil and the oil control valve 515 controls the operation of the second spool valve 510 to supply the hydraulic pressure to the first control line 521, or the second control line 522.

The first control line 521 is connected to the second supply port 212 of the first spool valve 109 through the crankshaft 505, and the second control line 522 is connected to the first supply port 210 of the first spool valve 109 through the crankshaft 505.

In an exemplary embodiment of the present invention, when the control hydraulic pressure is supplied to the second spool valve 510 by the oil control valve 515, the plunger of the second spool valve 510 moves in the left. Thus, the oil input hole 511 and the second oil supply hole 513 are communicated with each other, and the hydraulic pressure is supplied to the second control line 522.

Accordingly, the hydraulic pressure is supplied to the first supply port 210 of the first spool valve 109 connected to the second control line 522, as shown in FIG. 1 (a) and FIG. 2, the second chamber 157 is expanded, thereby realizing the low compression ratio.

Figure 8:
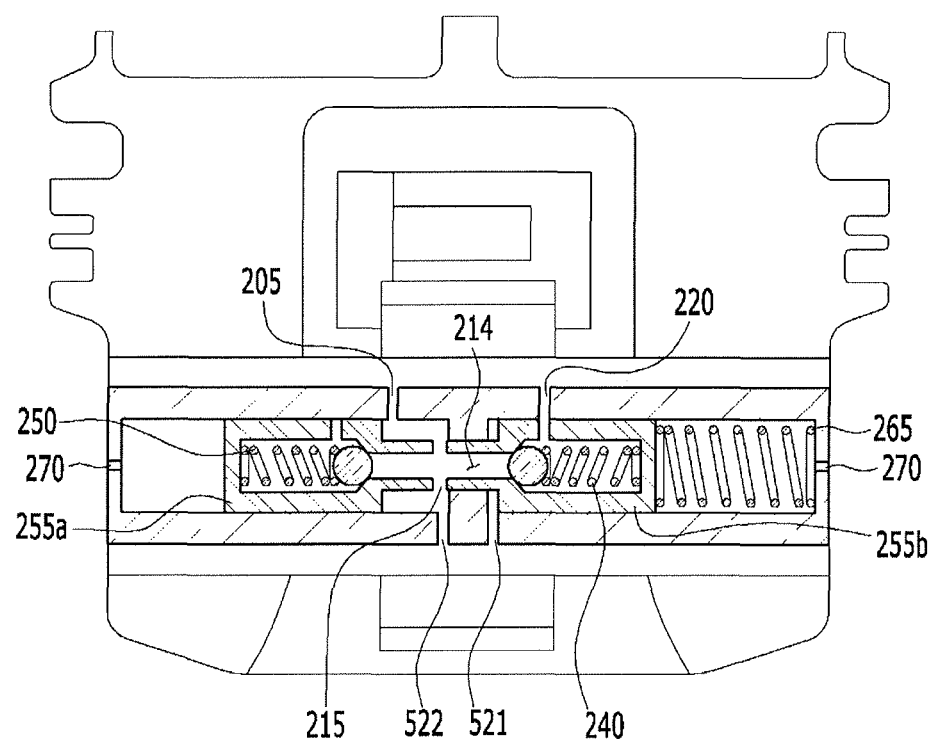
FIG. 8 is a cross-sectional view of a piston of a variable compression ratio apparatus according to another exemplary embodiment of the present invention.

FIG. 8 is a cross-sectional view of a piston of a variable compression ratio apparatus according to another exemplary embodiment of the present invention.

The first spool valve 109 according to an exemplary embodiment of the present invention may connect the piston 500 and the connecting rod 145 like function of the piston pin 105.

The first control pressure of the first control line 521 connected to the second spool valve 510 is supplied to the second supply port 212 of the first spool valve 109 and the first chamber 155 is expanded, thereby realizing the high compression ratio.

The second control pressure of the second control line 522 connected to the second spool valve 510 is supplied to the first supply port 210 of the first spool valve 109 and the second chamber 157 is expanded, thereby realizing the low compression ratio.

Figure 9:
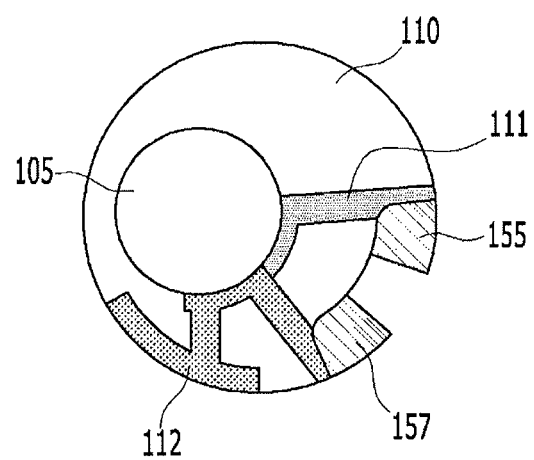
FIG. 9 and FIG. 10 are views showing a hydraulic pressure transmission structure of an eccentric cam according to an exemplary embodiment of the present invention.
Figure 9:
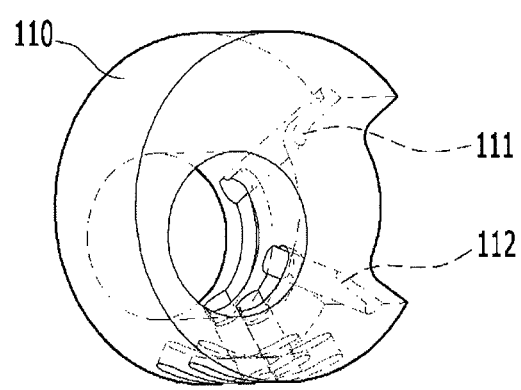
Figure 10:
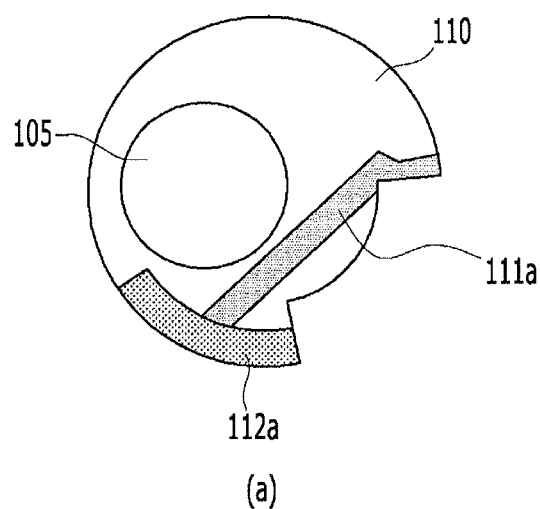
Figure 10:
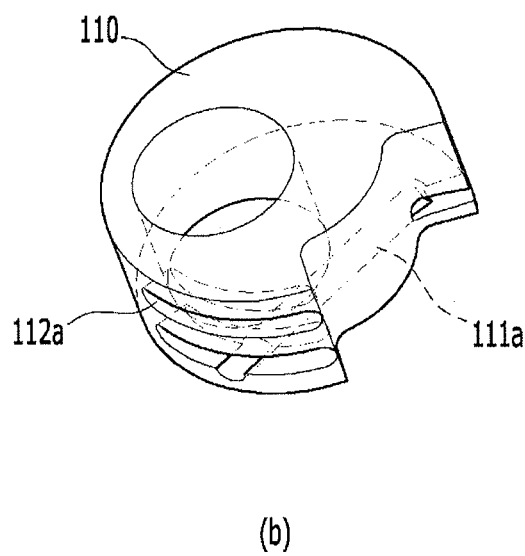

FIG. 9 and FIG. 10 are views showing a hydraulic pressure transmission structure of an eccentric cam according to an exemplary embodiment of the present invention.

Referring to FIG. 9, a first cam line 111 communicated with the first chamber 155 and a second cam line 112 communicated with the second chamber 157 are formed at the internal circumference of the eccentric cam 110. The first and second cam lines 111 and 112 may be simultaneously formed as well as the processing of the eccentric cam 110 such that there is a merit that the processing is easy.

Referring to FIG. 10, a first cam line 111a communicated with the first chamber 155 and a second cam line 112b communicated with the second chamber 157 are formed while penetrating between the internal circumference and the external circumference of the eccentric cam 110

The first and second cam lines 111a and 112b may be formed while penetrating the middle of the eccentric cam 110 such that there is a merit that the structure is simple.

Figure 11:
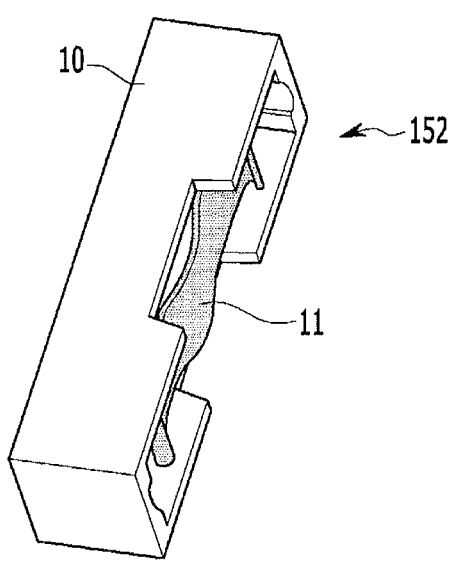
FIG. 11 is a perspective view of a sealing member according to an exemplary embodiment of the present invention.

FIG. 11 is a perspective view of a sealing member according to an exemplary embodiment of the present invention.

Referring to FIG. 11, the sealing member 152a disposed at the front end portion of the chamber separation wall 150 of FIG. 1 includes a contact member 10 close to the external circumference of the eccentric cam 110 to be sliding and an elastic member 11 elastically pushing the contact member 11 to the eccentric cam 110.

Therefore, the hydraulic pressure is prevented from being leaked between the first chamber 155 and the second chamber 157 through this structure, rapidly and correctly realizing the high compression ratio and the low compression ratio.

Figure 12:
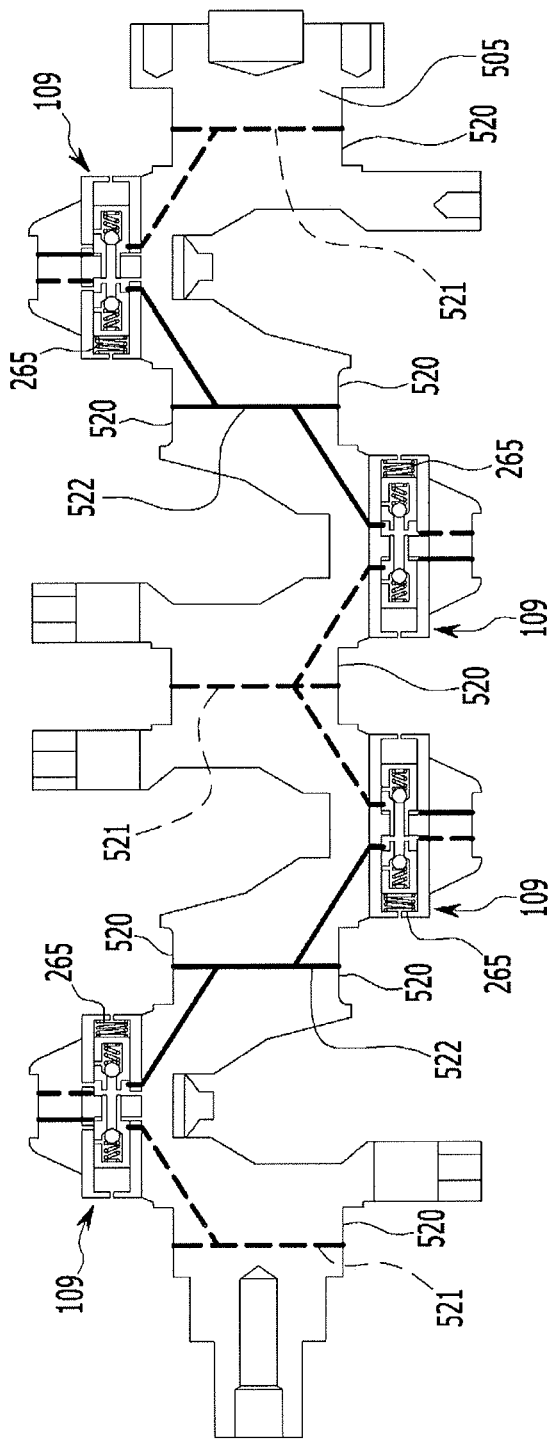
FIG. 12, FIG. 13, and FIG. 14 are cross-sectional views showing a mounting direction of a first spool valve and an arrangement structure of a first and second control lines formed at a crankshaft in a variable compression ratio apparatus according to an exemplary embodiment of the present invention.
Figure 13:
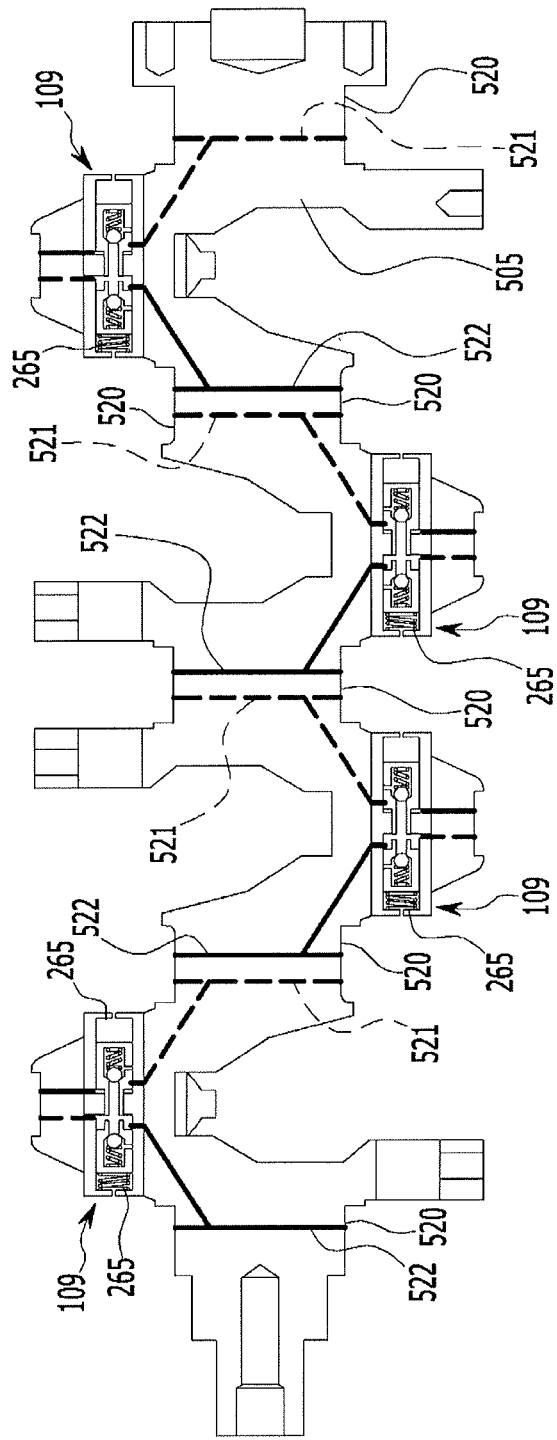
Figure 14:
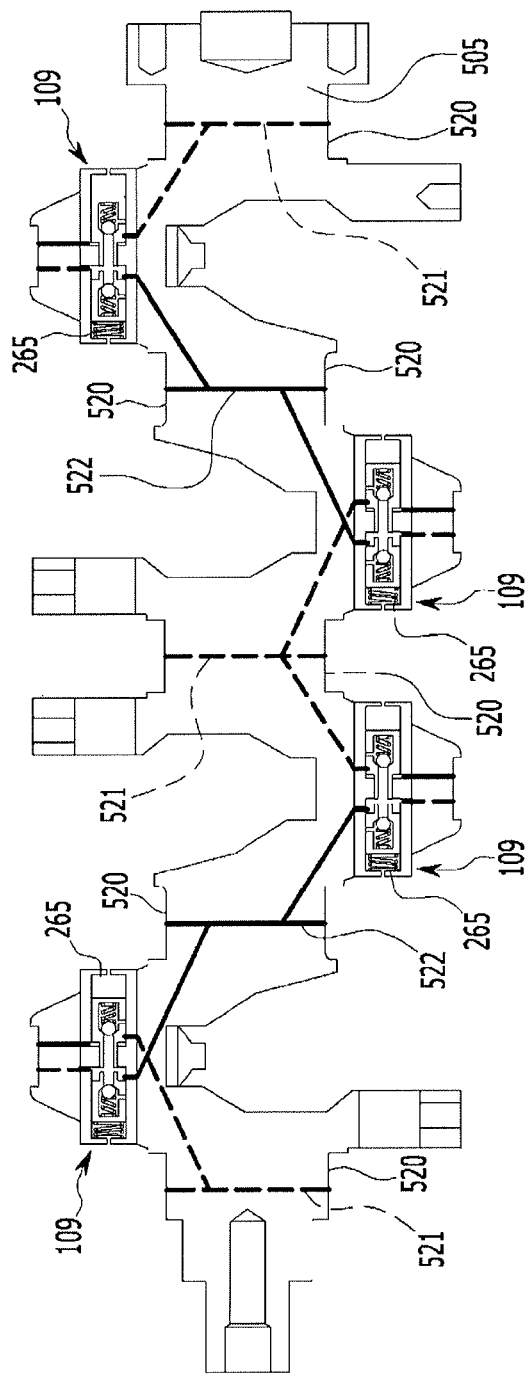

FIG. 12, FIG. 13, and FIG. 14 are cross-sectional views showing a mounting direction of a first spool valve and an arrangement structure of a first and second control lines formed at a crankshaft in a variable compression ratio apparatus according to an exemplary embodiment of the present invention.

Referring to FIG. 12, the first spool valve 109 connects the crankshaft 505 and the connecting rod 145, configured as the crank pin. Four first spool valves 109 are disposed respectively corresponding to the first to the fourth cylinders, but it is not limited thereto.

Here, when is defined that the structure that the return member 265 is disposed in the right in the first spool valve 109 is referred to as a forward direction, the first spool valve 109 may be disposed in the forward direction, the backward direction, the forward direction, and the backward direction from the left.

Also, a first control line 521, a second control line 522, a first control line 521, a second control line 522, and a first control line 521 are sequentially formed from the left of the drawing at each contact portion 520 in which the crankshaft 505, for example, is supported by the bearing.

In an exemplary embodiment of the present invention shown in FIG. 12, there is a merit that one control line is formed at the contact portion 520.

Referring to FIG. 13, the first spool valve 109 has the function of the crank pin connecting the crankshaft 505 and the connecting rod 145. In the drawing, four first spool valves 109 are disposed respectively corresponding to the first to fourth cylinders but it is not limited thereto.

Here, when it is defined that the structure that the return member 265 is disposed at the right in the first spool valve 109 is referred to as the forward direction, the first spool valve 109 may be all disposed in the backward direction.

Also, a second control line 522, first and second control lines 521 and 522, first and second control lines 521 and 522, first and second control lines 521 and 522, and a first control line 521 are sequentially formed from the left of the drawing at each contact portion 520 contacted with the bearing at the crankshaft 505.

In one exemplary embodiment of the present invention shown in FIG. 13, the first spool valve 109 is disposed in the same direction, there is an effect that the assemble is simple.

Referring to FIG. 14, the first spool valve 109 is configured as the function of the crank pin by connecting the crankshaft 505 and the connecting rod 145. Four first spool valves 109 are disposed respectively corresponding to the first to fourth cylinders, but it is not limited thereto.

Here, it is defined that the structure that the return member 265 is disposed in the right at the first spool valve 109 is referred to as the forward direction, the first spool valve 109 may be all disposed in the backward direction.

Also, the first control line 521, the second control line 522, first control line 521, the second control line 522, and the first control line 521 are sequentially formed at each contact portion 520 contacted with the bearing in the crankshaft 505.

Here, the first control line 521 and the second control line 522 are formed to be crossed at the portion near the first spool valve 109 such that the first spool valve 109 may be disposed in the same direction. Accordingly, the assemble process may be simplified, and one control line may be formed at each contact portion 520.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable compression ratio apparatus including an eccentric cam interposed at an internal circumference of a front end portion of a connecting rod, in which a first chamber is formed to realize a high compression ratio by a piston by rotating the eccentric cam in one direction and a second chamber is formed to realize a low compression ratio by the piston by rotating the eccentric cam in an opposite direction to the one direction, comprising: and
   a first spool valve selectively supplying a hydraulic pressure to expand the first chamber or the second chamber for realizing the high compression ratio or the low compression ratio,
   wherein the first spool valve is provided to connect the piston and the connecting rod or to connect a crankshaft and the connecting rod, and wherein the first spool valve includes:
a valve housing in which first and second plunger spaces are formed at a first side and a second side inside, a partition separating an inner space of the valve housing into the first and second plunger spaces and including a partition path communicating the first and second plunger spaces is formed, a first exit port communicating the first chamber and the first plunger space and a second exit port communicating the second chamber and the second plunger space are formed, and first and second supply ports receiving an oil with the first and second plunger spaces are formed;
a plunger device including a first plunger slidable in the first plunger space and including a first check space formed inside and a first check path connected to an external circumference at the first check space and selectively communicated with the first exit port, a second plunger slidable in the second plunger space and including a second check space formed inside and a second check path connected to the external circumference in the second check space and selectively communicated with the second exit port, and a connection pipe slidably mounted in the partition path and connecting the first and second plungers to each other through the partition path and including a pipe path connecting the first and second check spaces to each other and an open path communicated with the first plunger space or the second plunger space depending on a moving position of the connection pipe;
a first check valve disposed in the first check space to move the oil from the pipe path to the first check space in one direction and a second check valve disposed in the second check space to move the oil from the pipe path to the second check space in one direction; and
a return member elastically supporting the second plunger.

2. The variable compression ratio apparatus of claim 1, further including:
a second spool valve forming a control hydraulic pressure for operation of the first spool valve; and
an oil control valve controlling operation of the second spool valve,
wherein the second spool valve and the oil control valve are separately provided or integrally formed.

3. The variable compression ratio apparatus of claim 1, wherein
the second check path and the second exit port are communicated depending on an oil supply through the first supply port, and the oil supplied through the first supply port and the oil of the first chamber is supplied to the second chamber through the open path, the pipe path, the second check valve, the second check path, and the second exit port to realize the low compression ratio.

4. The variable compression ratio apparatus of claim 1, wherein
the first check path and the first exit port are communicated depending on the oil supply through the second supply port, and the oil supplied through the second supply port and the oil of the second chamber is supplied to the first chamber through the open path, the pipe path, the first check valve, the first check path, and the first exit port to realize the high compression ratio.

5. The variable compression ratio apparatus of claim 1, wherein
an external diameter of the first plunger is greater than an internal diameter of the partition path, and an external diameter of the second plunger is greater than an internal diameter of the partition path.

6. The variable compression ratio apparatus of claim 1, wherein the oil supplied through the first supply port is configured to be operated to move the first plunger in one direction, and the oil supplied through the second supply port is configured to be operated to move the second plunger in an opposite direction.

7. The variable compression ratio apparatus of claim 6, wherein
when a force of the return member and the force of an oil pressure supplied through the first supply port is greater than the force of the oil pressure supplied through the second supply port,
the second check path and the second exit port are communicated, the oil supplied through the first supply port and the oil of the first chamber is supplied to the second chamber through the open path, the pipe path, the second check valve, the second check path, and the second exit port to realize the low compression ratio.

8. The variable compression ratio apparatus of claim 6, wherein
when the force of the oil pressure supplied to the second supply port is greater than the force of the return member and the force of the oil pressure supplied through the first supply port,
the first check path and the first exit port are communicated, and the oil supplied through the second supply port and the oil of the second chamber is supplied to the first chamber through the open path, the pipe path, the first check valve, the first check path, and the first exit port to realize the high compression ratio.

9. The variable compression ratio apparatus of claim 6, wherein the return member is disposed inside the second plunger space to be an elastic member to elastically support the second plunger.

10. The variable compression ratio apparatus of claim 6, wherein
the oil supplied to the first chamber is configured to rotate the eccentric cam in one direction by a predetermined angle to increase a top dead center of the piston, and
the oil supplied to the second chamber is configured to rotate the eccentric cam in the other direction by a predetermined angle to lower the top dead center of the piston.

11. The variable compression ratio apparatus of claim 1, wherein
the oil supplied to the first chamber is configured to rotate the eccentric cam in one direction by a predetermined angle to increase a top dead center of the piston, and
the oil supplied to the second chamber is configured to rotate the eccentric cam in the other direction by a predetermined angle to lower the top dead center of the piston.

12. The variable compression ratio apparatus of claim 1, wherein
in a state that the first and second plungers move in one direction, the open path is connected to the first plunger space, and
in a state that the first and second plungers move in an opposite direction, the open path is connected to the second plunger space.

13. The variable compression ratio apparatus of claim 1, wherein
the piston includes a first to fourth pistons corresponding to each cylinder,
each of first spool valves is respectively provided corresponding to the first to fourth pistons, and
the first spool valves are respectively disposed to be crossed in a forward direction of a corresponding return member of the first spool valves and a backward direction of the corresponding return member of the first spool valves.

14. The variable compression ratio apparatus of claim 1, wherein
the piston includes a first to fourth pistons disposed respectively corresponding to each of cylinders,
each of first spool valves is respectively provided corresponding to the first to fourth pistons,
the first spool valves are respectively disposed to be crossed in a forward direction of a corresponding return member of the first spool valves or a backward direction of the corresponding return member of the first spool valves.

15. The variable compression ratio apparatus of claim 1, wherein
a contact portion supporting the crankshaft to be rotatable is formed at the crankshaft, and
a second control path connected to the first supply port of the first spool valve or a first control path connected to the second supply port are formed at the contact portion.

16. The variable compression ratio apparatus of claim 1, wherein the second control path and the first control path are formed at one among contact portions.

17. The variable compression ratio apparatus of claim 1, wherein one of the second control path and the first control path is formed at one among contact portions.

18. The variable compression ratio apparatus of claim 1, wherein the first control path is only formed at one among contact portions, and the second control path is only formed at the other contact portion adjacent to the one among the contact portions.

19. The variable compression ratio apparatus of claim 18, wherein
one among the first control path and one among the second control path are formed to be crossed to each other.

* * * * *